(12) United States Patent
Shimizu et al.

(10) Patent No.: US 7,042,653 B2
(45) Date of Patent: May 9, 2006

(54) SWITCHING MECHANISM AND ELECTRONIC INSTRUMENT USING THE SAME

(75) Inventors: Yukiko Shimizu, Saitama (JP); Shun Kayama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/928,246

(22) Filed: Aug. 30, 2004

(65) Prior Publication Data
US 2005/0046965 A1 Mar. 3, 2005

(30) Foreign Application Priority Data
Sep. 3, 2003 (JP) ............... 2003-311303

(51) Int. Cl.
*G02B 15/14* (2006.01)
(52) U.S. Cl. .................. 359/694; 359/703; 359/704
(58) Field of Classification Search ............... 359/694, 359/696, 697, 703, 704
See application file for complete search history.

(56) References Cited

U.S. PATENT DOCUMENTS
4,159,492 A * 6/1979 Ban et al. ............... 360/74.3

FOREIGN PATENT DOCUMENTS
JP 11295777 A * 10/1999

* cited by examiner

*Primary Examiner*—Scott J. Sugarman
(74) *Attorney, Agent, or Firm*—Oblon, Spivak, McClelland, Maier & Neustadt, P.C.

(57) ABSTRACT

A first arm rotating within a predetermined angle about its rotational center is linked to a second arm rotating in a direction opposite to a rotation direction of said first arm. Two shrinking members are mounted on one end of the first arm. Two shrinking members shrink in opposite directions for each other each time when any one of them is energized. According to a switch of electricity to the two shrinking members, the first arm rotates to switch a rotational position thereof, with the second arm rotating to switch a rotational position of the second arm.

8 Claims, 5 Drawing Sheets

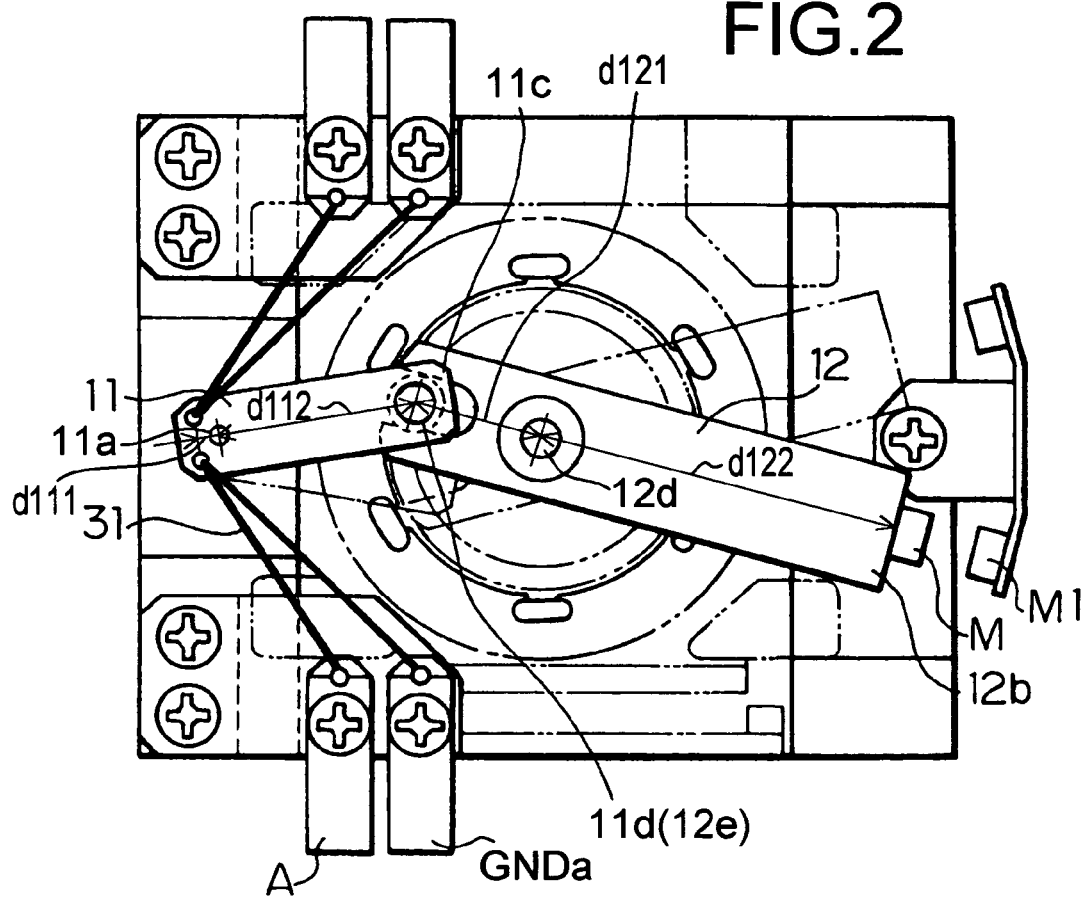

SWITCHING MECHANISM AND ELECTRONIC INSTRUMENT USING THE SAME

BACKGROUND OF THE INVENTION

1. Field of the Invention

The present invention relates to a switching mechanism for switching a position of a movable member and an electronic instrument using the same such as an electronic instrument equipped with an imaging device.

2. Description of Related Art

Various types of the electronic instruments equipped with an imaging device, such as a notebook personal computer, a personal digital assistant (PDA), and a cellular phone have recently been developed. It has been indispensable to improve performance of the imaging device and reduce its size. Especially if a small-sized imaging device is incorporated in an electronic instrument, the performance thereof is liable to deteriorate due to lens aberration etc when optical elements are downsized. Thus, the lens itself has its limits in miniaturization. This results in simplifying a member for holding optical elements and a driving mechanism therefor.

Conventionally, as a switching mechanism for switching a position of an optical element, for example, a filter or a lens, in an imaging device, it has been disclosed that an arm is attached to a member subject to movement so that the arm may be manually moved or the arm is moved using a motor as a driving source.

In such the switching mechanism, however, to manually drive the arm attached to a moving member, it is necessary to mount the member (arm or holding frame) on a chassis of an electronic instrument, so that this member acts as a protrusion on the chassis. This prevents miniaturization, thus damaging appearances problematically. Further, such a configuration that the arm can be driven using a motor in the chassis requires a space for housing the motor and increases a weight thereof as a whole.

SUMMARY OF THE INVENTION

To solve these problems, the present invention has been developed. That is, it is an object of the present invention to provide a switching mechanism for switching a position of a movable member.

It is another object of the present invention to provide an electronic instrument in which a switching mechanism switches a position of a movable member.

In order to accomplish the object, as an aspect of the present invention, there provides a switching mechanism. The switching mechanism comprises a first arm rotating about a rotational center thereof within a predetermined angle. The first arm has two ends with respect to the rotational center thereof. The switching mechanism also comprises two shrinking members. Each of them mounted on one end of the first arm. The two shrinking members shrink in opposite directions for each other. Any one of the two shrinking members shrinks when the shrinking member is energized. The switching mechanism further comprises a second arm rotating about a rotational center thereof in a direction opposite to a rotation direction of the first arm. The second arm is linked to the other end of the first arm. According to a switch of electricity to the two shrinking members, the first arm rotates to switch a rotational position thereof with the second arm rotating to switch a rotational position of the second arm.

In order to accomplish another object, as another aspect of the present invention, there provides an electronic instrument equipped with the switching mechanism as described above for switching a position of the movable member.

In the present invention, the two shrinking members shrink in opposite directions for each other each time when any one of them is energized in order to switch a position of the movable member. Such the electrical switch causes the position of the movable member to be switched according to the shrinkage as driving source. Further, the shrinkage of the shrinking members is transmitted through the first and second arms, so that even if a small amount of shrinkage of the shrinking members occurs, it is enough to move the second arm.

According to the present invention, miniaturization and a reduction in thickness of the switching mechanism are implemented. As compared with a case where a motor is used as a driving source, the switching mechanism according to the present invention may realize low power consumption, a cost-reduction, and high-reliability. Further, according to the present invention, miniaturization and a reduction in thickness of the electronic instrument are also implemented. Because the switching mechanism is built in the chassis of the electronic instrument, the present invention avoids appearance of the electronic instrument from damaging. That allows flexibility in a chassis design of the electronic instrument to be increased.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is an explanatory schematic plan view (No. 1) for illustrating operations of the switching mechanism;

DESCRIPTION OF THE PREFERRED EMBODIMENTS

Figure 1A:
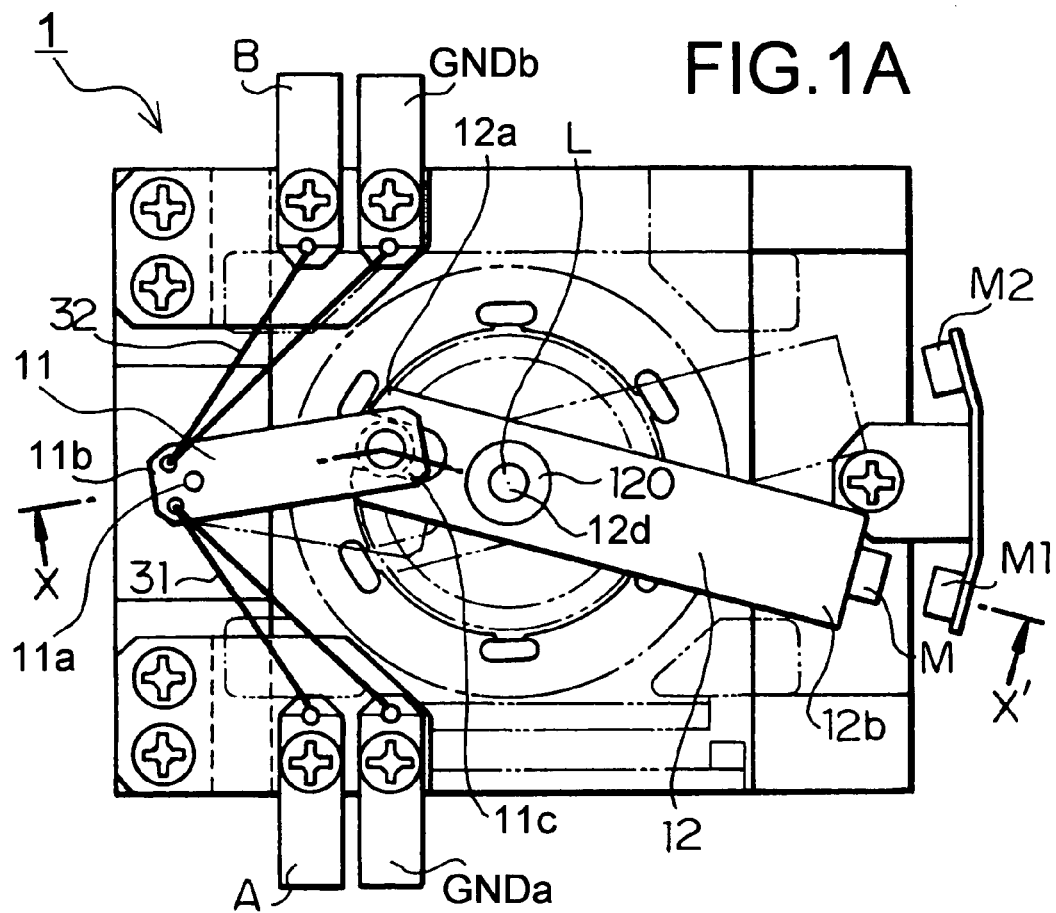
FIGS. 1A and 1B are explanatory schematic diagrams of a switching mechanism related to the present embodiment.
Figure 1B:
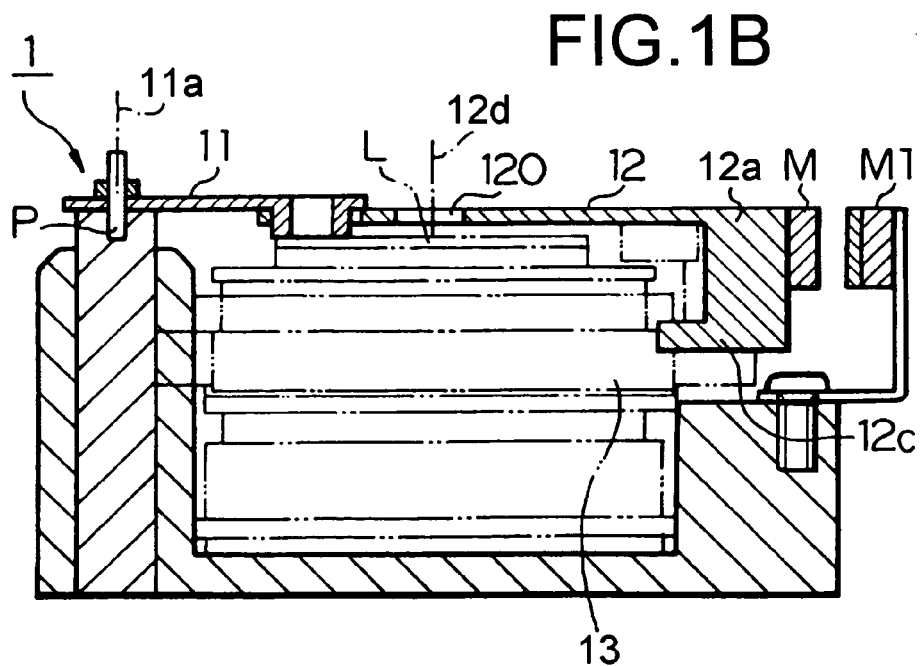

The following will describe embodiments of the present invention with reference to the drawings. FIGS. 1A and 1B are explanatory schematic diagrams of a switching mechanism related to the present embodiment. FIG. 1A is a plan view of the switching mechanism 1 and FIG. 1B is a cross-sectional view taken along line X—X' of FIG. 1A. That is, this switching mechanism 1 comprises a first arm 11 that can rotate within a predetermined angle about a rotational center 11a. The switching mechanism 1 also comprises two shape-memory alloys (shrinking members) 31 and 32 that are mounted to one end 11b of the first arm 11 with respect to a rotational center 11a of the first arm 11. The two shape-memory alloys shrink in opposite directions for each other. Any one of them shrinks when it is energized. The switching mechanism 1 further comprises a second arm 12 that can rotate in a rotation direction opposite to that of the first arm 11. The second arm 12 is linked to the other end 11c of the first arm 11 with respect to the rotational center 11a.

In such a configuration of the switching mechanism 1, by using the two shape-memory alloys 31 and 32 as a driving source, the first arm 11 rotates, which rotation is transmitted to the second arm 12, thus rotating the other end 12b of the second arm 12.

The other end 12b of the second arm 12 extends downward. An extension 12c thereof is engaged with a cam ring 13 of a lens L or with a pin for rotating the cam ring 13. Therefore, rotating the other end 12b of the second arm 12 enables the cam ring 13 to rotate via the extension 12c, thereby permitting the lens L to advance and retreat along an optical axis thereof.

The shape-memory alloys 31 and 32 employed in the switching mechanism 1 of the present embodiment have such properties that they each shrink when they are energized (i.e., the shape is memorized) and are restored in shape when they are de-energized. As the shape-memory alloys 31 and 32 having such properties, an alloy composed of, for example, Ti (titanium), Ni (nickel), and Cu (copper) may be used. It shrinks about 4% when energized.

The first shape-memory alloy 31 of the two shape-memory alloys 31 and 32 has its one end connected to an electrode A and the other end connected to a ground electrode GNDa through one end 11b of the first arm 11. The second shape-memory alloy 32, on the other hand, has its one end connected to an electrode B and the other end connected to a ground electrode GNDb through the one end 11b of the first arm 11.

Therefore, turning ON/OFF a voltage applied to the electrodes A and B allows the first or second shape-memory alloy 31 or 32 to shrink and un-shrink, thereby switching a fixed position of the second arm 12 in rotation via the first arm 11.

In the present embodiment, in particular, the extension 12c of the second arm 12 is engaged with the cam ring 13 of the lens L. The cam ring 13 has a curve such that by rotating this cam ring, the lens L may advance and retreat along the optical axis thereof. Therefore, by switching the fixed position of the second arm 12, the rotational position of the cam ring 13 can be switched, thereby switching a path in the optical axis along which the lens L advances and retreats.

Further, in the present embodiment, a distance (d112) from the rotational center 11a of the first arm 11 to a linkage position 11d of the first arm 11 to the second arm 12 is set longer than a distance (d111) from the rotational center 11a to a line connecting mounting positions of the two shape-memory alloys 31 and 32, as shown in FIG. 2.

For example, by setting a distance (d112) eight times through nine times as large as a distance (d111), an amount of movement in the one end 11b of the first arm 11 can be amplified as much as six through nine times (preferably eight through nine times) at the other end 11c.

As for the second arm 12 also, a distance (d122) from its rotational center 12d to the other end 12b is set longer than a distance (d121) from the rotational center 12d to the linkage position 12e of the second 12 to the first arm 11, as shown in FIG. 2.

For example, by setting distance (d122) twice through three times as large as distance (d121), an amount of movement in the one end 12a of the second arm 12 can be amplified as much as 1.5 times through three times (preferably twice through three times) at the other end 12b.

Therefore, according to the switching mechanism 1 of the present embodiment, an amount of movement in the one end 11b of the first arm 11 can be amplified as much as 12 times through 27 times and transmitted to the other end 12b of the second arm 12.

If a shrinkage percentage of each of the shape-memory alloys 31 and 32 is supposed to be 4%, a drive distance can be amplified as much as 12 times through 27 times this shrinkage percentage, that is, 48% through 108% calculated as shrinkage percentage. Note here that these values are one example and may be set as appropriate one depending on a relationship with driving force.

Further, the other end 12b of the second arm 12 is mounted with a magnet M. As facing the magnet M, opposite magnets M1 and M2 are arranged in such a manner as to correspond to the two fixed positions of the second arm 12.

These fixed positions of the second arm 12 can be made sure by attracting force of these magnets M1 and M2. That is, when the second arm 12 rotates clockwise, the magnet M is attracted to the oppose magnet M1, thus fixing it at the clockwise fixed position by the maximum attracting force of the magnet M1. When the second arm 12 rotates counter-clockwise, on the other hand, the magnet M is attracted to the oppose magnet M2, thus fixing it at the counter-clockwise fixed position by the maximum attracting force of the magnet M2.

Figure 3:
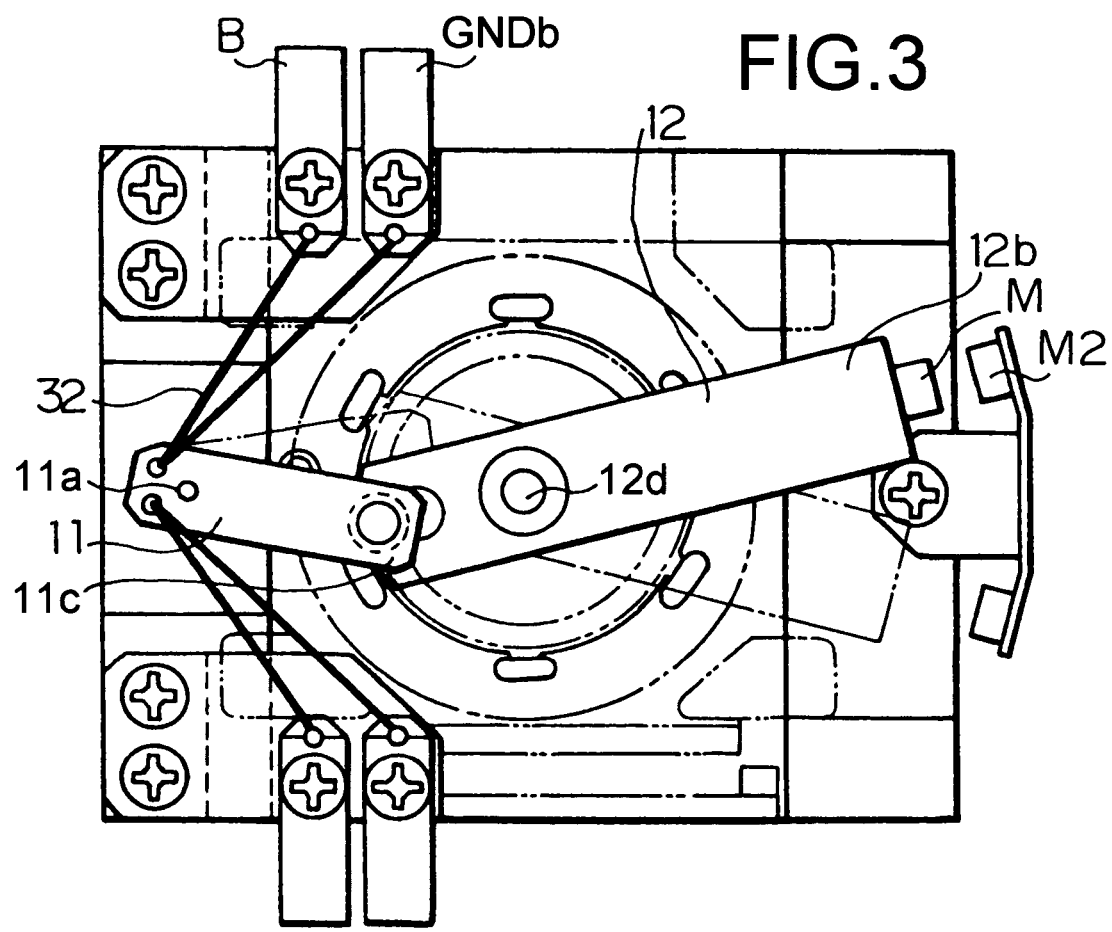
FIG. 3 is an explanatory schematic plan view (No. 2) for illustrating the operations of the switching mechanism.

The following will describe operations of the switching mechanism 1 of the present embodiment. FIGS. 2 and 3 show explanatory schematic plan views of the switching mechanism 1. First, the operation shown in FIG. 2 will be described. This operation takes place in a condition where voltage is applied between the electrode A and the ground electrode GNDa.

When voltage is applied between the electrode A and the ground electrode GNDa, the first shape-memory alloy 31 shrinks by a predetermined percentage. This shrinkage of the first shape-memory alloy 31 causes the one end 11b of the first arm 11 to move toward the electrode A as attracted thereby. Accordingly, the first arm 11 rotates counter-clockwise around the rotational center 11a.

When the first arm 11 rotates counter-clockwise, the second arm 12 linked with the other end 11c of the first arm 11 rotates clockwise around the rotational center 12d. Accordingly, the other end 12b of the second arm 12 rotates, so that the magnet M moves toward the oppose magnet M1 as attracted thereby and is fixed at a position shown in FIG. 2. It is thus possible to rotate the cam ring 13 (see FIG. 1B) of the lens L via the extension 12c (see FIG. 1B) of the second arm 12.

If no voltage is applied between the electrode A and the ground electrode GNDa and voltage is applied between the electrode B and the ground electrode GNDb, on the other hand, the second shape-memory alloy 32 shrinks by a predetermined percentage. This shrinkage of the second shape-memory alloy 32 causes the one end 11b of the first arm 11 to move toward the electrode B as attracted thereby. Accordingly, the first arm 11 rotates clockwise around the rotational center 11a.

When the first arm 11 rotates clockwise, the second arm 12 linked with the other end 11c of the first arm 11 rotates counter-clockwise around the rotational center 12d. Accordingly, the other end 12b of the second arm 12 rotates in a direction opposite to that described above, so that the magnet M moves toward the opposed magnet M2 as attracted thereby and is fixed at a position shown in the FIG. 3. It is thus possible to rotate in the opposite direction the cam ring 13 (see FIG. 1B) of the lens L via the extension 12c (see FIG. 1B) of the second arm 12.

As described above, according to the switching mechanism 1 related to the present embodiment, applying voltage to the electrode A or B allows the fixed position of the second arm 12 in rotation to be switched.

Figure 4:
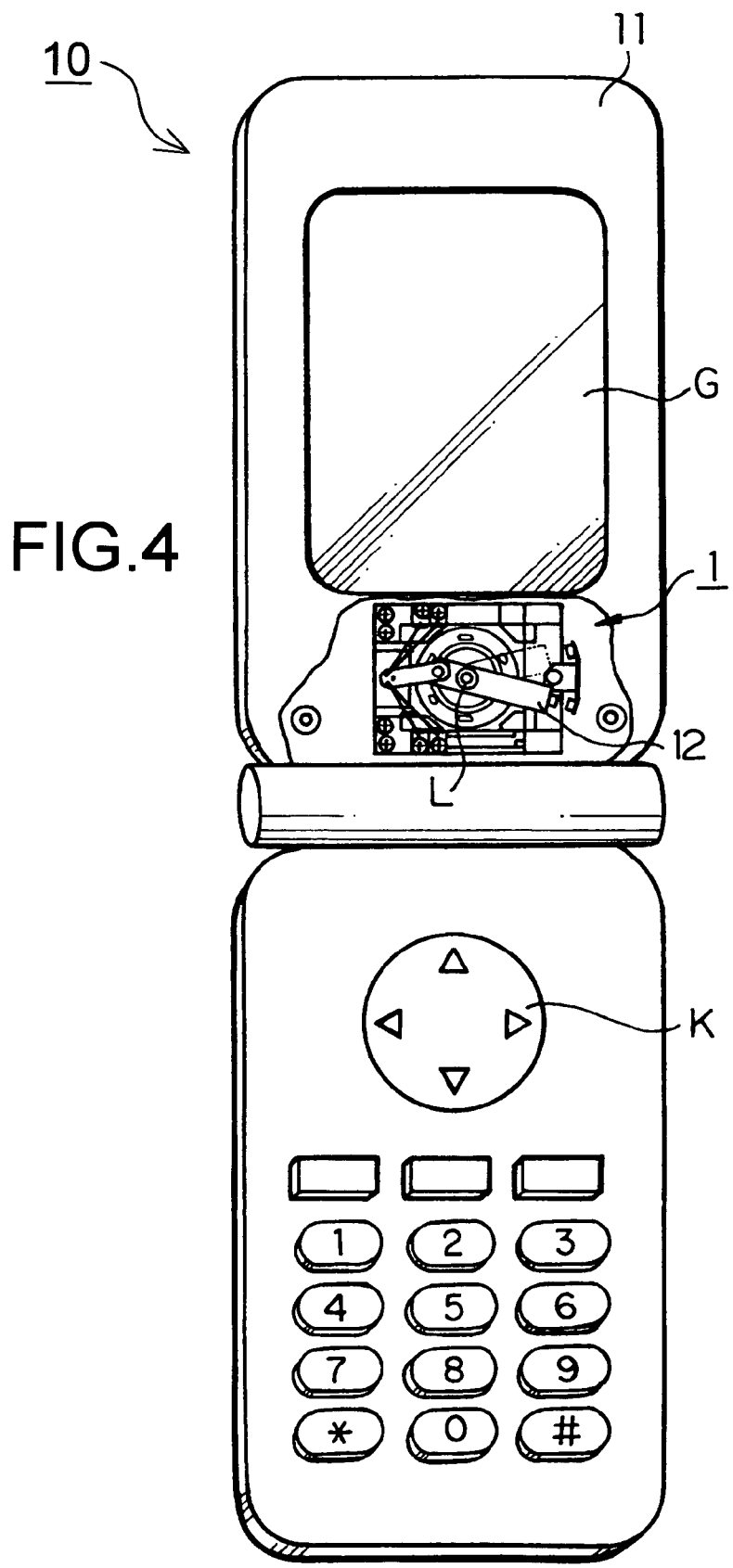
FIG. 4 is an explanatory schematic diagram for illustrating an example of application to a cellular phone (in a condition where it is open)
Figure 5:
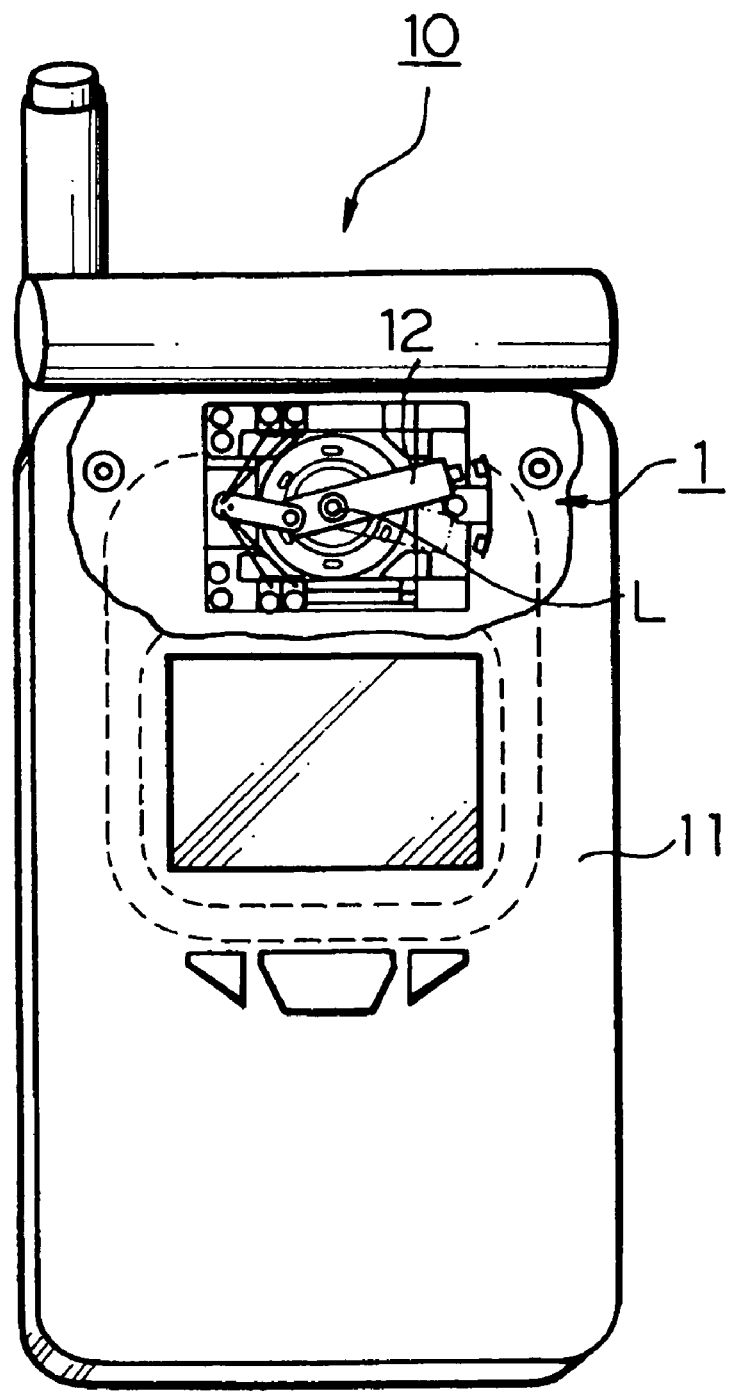
FIG. 5 is an explanatory schematic diagram for illustrating the example of application to the cellular phone (in a condition where it is closed).

The following will describe other embodiments of the invention wherein the above switching mechanism is applied to an electronic instrument such as a cellular phone. FIGS. 4 and 5 each schematically show the cellular phone to which the switching mechanism is applied. FIG. 4 shows a condition where it is open and FIG. 5 shows a condition where it is closed.

The switching mechanism 1 of the present embodiment is applied to a lens driving mechanism for an imaging device in a cellular phone 10, especially, to a switching mechanism for switching between an ordinary photographing mode and a macro photographing mode made by permitting the lens L to advance and retreat a little along the optical axis (in a direction perpendicular to the figure) of the lens L.

That is, the switching mechanism 1 of the present embodiment is incorporated around the lens L in the chassis 11 of the cellular phone in such a configuration that the second arm 12 of the switching mechanism 1 is linked with a cam ring (not shown) which permits the lens L to advance and retreat. Therefore, when the second arm 12 rotates, the cam ring rotates correspondingly, which rotation causes the lens L to advance and retreat along the optical axis of the lens L.

To use the imaging device in the cellular phone 10, it is necessary to set a camera photographing mode through a predetermined key operation and then press a key that corresponds to a shutter button at a desired timing with watching an image displayed on a screen G. It is thus possible to acquire an image captured by the imaging device.

In image capture in such a cellular phone 10, when an image is displayed on the screen G in the photographing mode, if an UP arrow key on the keypad K is pressed, for example, a telescopic function such as a digital zoom function is activated, thereby enabling an image that is zoomed up each time the key is pressed to be captured.

If a DOWN arrow key on the keypad K is pressed, for example, on the other hand, a wide-angle function such as the digital zoom function is activated, thereby enabling an image that is zoomed down each time the key is pressed to be captured.

Further, in the present embodiment, by pressing the DOWN arrow key one more time after pressing it until the largest wide angle is obtained, switchover is made to the macro photographing mode (however, any other key may be used to enter the macro photographing mode). By thus pressing the key, voltage is applied to the electrode A or B of the above-mentioned switching mechanism 1 (see FIG. 1A), to rotate the second arm 12 and fix it to the first rotational position (see FIG. 2) or the second rotational position (see FIG. 3), respectively. When the second arm 12 is thus rotated and fixed to the position, the lens L moves to a position that corresponds to the macro-photographing mode and is fixed there.

If the UP arrow key is pressed to make switchover from the macro photographing mode to the ordinary photographing mode, on the other hand, voltage is applied to the electrode B or A of the above-mentioned switching mechanism, to rotate the second arm 12 in a direction opposite to the direction described above and fix it to the second rotational position (see FIG. 3) or the first rotational position (see FIG. 2), respectively. When the second arm 12 is thus rotated and fixed to the position, the lens L moves to a position that corresponds to the ordinary photographing mode and is fixed there.

Further, in a case where the cellular phone 10 of the present embodiment is equipped with measuring device for measuring a distance to an object, the mode may be automatically switched between the ordinary photographing mode and the macro photographing mode depending on a measured distance.

In this case, if the distance to the object falls below a constant value, voltage is applied to the electrode A or B of the switching mechanism 1 of the present embodiment to rotate the second arm 12 and fix it to the first or second rotational position, respectively, thereby setting the lens L to a position to the macro photographing mode. If the distance to the object exceeds the constant value, on the other hand, voltage is applied to the electrode B or A of the switching mechanism to rotate the second arm 12 and fix it to the second or first rotational position respectively, thereby setting the lens L to a position to the ordinary photographing mode.

In either case, in the cellular phone 10 of the present embodiment, the switching mechanism for the lens L can be housed in the chassis 11 and so does not protrude from the chassis 11, thereby enabling a reduction in thickness of the chassis 11 and improving the appearances in design. Further, switchover can be made between the macro and ordinary photographing modes through electrical operations, so that a user can switch between them by key operations as watching an image or perform macro photographing and ordinary photographing by switchover automatically not manually.

Especially in the switching mechanism using the shape-memory alloys 31 and 32 as a driving source, since the shrinking percentage of the shape-memory alloys 31 and 32 is about 4%, the arm needs to have a length more than a constant if driving only the arm directly linked with a macro switching lever. This brings about an increase in size of the mechanism itself or a need to extend the shape-memory alloys 31 and 32 around lengthways.

To solve this problem, the switching mechanism 1 related to the present embodiment incorporates a mechanical amplifier at the arm to achieve a sufficient stroke, thereby enabling switchover between the two positions with an extremely small stroke. In this case, a center of an opening 120 positioned at the center of the optical axis of the second arm 12 is aligned with the rotational center 12d of the second arm 12, so that the opening 120 does not move even if the second arm 12 moves.

Therefore, transparent glass or plastic glass, if installed to the opening 120 at the optical axis center, serves as a cover to protect the lens L.

Although application of the present embodiment to the cellular phone 10 has been exemplified, it can be applied also to any other electronic instruments having a photographing function such as a digital still camera, a digital video camera, a notebook personal computer, or a portable terminal such as a PDA.

While the foregoing specification has described preferred embodiment (s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A switching mechanism comprising:

a first arm rotating about a rotational center thereof within a predetermined angle, said first arm having two ends with respect to a rotational center thereof;

two shrinking members each being mounted on one end of said first arm, said two shrinking members shrinking in opposite directions for each other, any one of said two shrinking members shrinking when one of said two shrinking members is energized; and a second arm rotating about a rotational center thereof in a rotation direction opposite to a rotation direction of said first arm, said second arm being linked to the other end of the first arm, wherein according to a switch of electricity to said two shrinking members, said first arm rotates to switch a rotational position thereof, with the second arm rotating to switch a rotational position of said second arm.

2. The switching mechanism according to claim 1, wherein a distance from the rotational center of said first arm to a linkage position thereof to said second arm is set longer than a distance from the rotational center of said first arm to a mounting position of each of said two shrinking members.

3. The switching mechanism according to claim 1, wherein a distance from said rotational center of said second arm to an end of said second arm, said end being opposite to a linkage position of said second arm to the first arm, is set longer than a distance from said rotational center of said second arm to said linkage position of said second arm.

4. The switching mechanism according to claim 1, wherein said second arm has an opening at the rotational center thereof, said opening forming an optical path of a lens.

5. An electronic instrument equipped with a switching mechanism for switching a position of a movable member, said switching mechanism comprising:

a first arm rotating about a rotational center thereof within a predetermined angle, said first arm having two ends with respect to the rotational center thereof;

two shrinking members each being mounted on one end of said first arm, said two shrinking members shrinking in opposite directions for each other, any one of said two shrinking members shrinking when one of said two shrinking members is energized; and a second arm rotating about a rotational center thereof in a rotation direction opposite to a rotation direction of said first arm, said second arm being linked to the other end of the first arm, wherein according to a switch of electricity to said two shrinking members, said first arm rotates to switch a rotational position thereof, with the second arm rotating to switch a rotational position of said second arm.

6. The electronic instrument according to claim 5, wherein a distance from the rotational center of said first arm to a linkage position thereof to said second arm is set longer than a distance from the rotational center of said first arm to a mounting position of each of said two shrinking members.

7. The electronic instrument according to claim 5, wherein a distance from said rotational center of said second arm to an end of said second arm, said end being opposite to a linkage position of said second arm to the first arm, is set longer than a distance from said rotational center of said second arm to said linkage position of said second arm.

8. The electronic instrument according to claim 5, wherein said second arm has an opening at the rotational center thereof, said opening forming an optical path of a lens.

* * * * *